United States Patent [19]

Spencer, Jr.

[11] 3,816,792

[45] June 11, 1974

[54] CATHODE RAY TUBE HIGH SPEED ELECTROMAGNETIC DEFLECTION SYSTEM

[75] Inventor: James M. Spencer, Jr., Phoenix, Ariz.

[73] Assignee: Sperry Rand Corporation, Great Neck, N.Y.

[22] Filed: Dec. 21, 1972

[21] Appl. No.: 317,473

[52] U.S. Cl. .......... 315/27 TD

[51] Int. Cl. .......... H01j 29/70

[58] Field of Search .......... 315/27 TD, 27 R, 28, 29

[56] References Cited

UNITED STATES PATENTS

| | | | |
|---|---|---|---|
| 3,541,385 | 11/1970 | Rothermal | 315/27 TD |
| 3,602,768 | 8/1971 | Williams | 315/27 TD |

*Primary Examiner*—Richard A. Farley

*Assistant Examiner*—J. M. Potenza

*Attorney, Agent, or Firm*—Howard P. Terry

[57] ABSTRACT

A cathode ray tube dual mode electromagnetic beam deflection control system including an amplifier for driving a deflection coil and means for switching between linear and resonant non-linear operational modes. In the linear mode, the yoke current is controlled to precisely follow an applied input deflection voltage by comparing the input voltage with a feedback voltage representative of the yoke current. In the non-linear mode, a capacitor is connected in circuit with the coil and the coil-capacitor circuit is simultaneously effectively disconnected from the amplifier output to enable resonant discharge between the coil and capacitor for fast beam retrace.

7 Claims, 6 Drawing Figures

CATHODE RAY TUBE HIGH SPEED ELECTROMAGNETIC DEFLECTION SYSTEM

The invention herein described was made in the course of or under a contract, or subcontract thereunder, with the Department of the Air Force.

BACKGROUND OF THE INVENTION

1. Field of the Invention

This invention relates to cathode ray tube electron beam deflection control systems and more particularly to electronic circuits employed in electromagnetic deflection systems for dual mode operation thereof in either a linear or resonant non-linear mode.

2. Description of the Prior Art

As is well understood to those skilled in the art, a television raster scanning system typically operates on the principle of fast repetitive horizontal scanning of an electron beam across the screen of a cathode ray tube while simultaneously slowly scanning in a vertical direction so that each successive horizontal line is slightly displaced vertically from the preceding one and then upon reaching the bottom of the screen the beam is vertically retraced to the top to repeat the procedure, the beam being blanked from the screen during the horizontal and vertical retrace intervals so as not to distort the information written during the forward horizontal and vertical scanning. A linear amplifier is suitable for providing the comparatively slow vertical deflection but in the case of the much faster horizontal deflection, resonant non-linear operation is customarily employed for the retrace in the interest of conserving power.

In recent years it has also been recognized that the vertical retrace interval may be efficaciously utilized for writing symbols on the cathode ray tube screen for simultaneous presentation with the video information written during the raster scan. This is accomplished simply by directing the beam during the vertical retrace to the location on the screen where a symbol is to be presented and then momentarily unblanking it to enable writing of the symbol by means of appropriate signals applied to the horizontal and vertical deflection amplifiers. A system operating in this manner is disclosed in U.S. Pat. No. 3,499,979 issued Mar. 10, 1970 to Fiorletta et al, and assigned to the assignee of the instant invention. As indicated in the Fiorletta et al patent, linear amplifying action is desired for the symbol writing operation. It is thus recognized that while linear operation is suitable and easily accommodated to the vertical deflection system for both raster scanning and symbol writing, a dichotomy of operating requirements exists in the horizontal deflection system as a result of the need for operating in both linear and non-linear modes. More specifically, in the case of the horizontal deflection system, linear operation is desired for forward line scanning and symbol writing while non-linear operation is desired for the horizontal retrace. To satisfy these diverse requirements, Fiorletta et al proposed the use of a dual mode amplifier which could be selectively switched between linear and non-linear operational modes.

Another dual mode amplifier which is considered an improvement over the Fiorletta et al amplifier as a consequence of having fewer components and simplified switching circuits is disclosed in U.S. Pat. application Ser. No. 132,950 filed Apr. 12, 1971 in the name of H.C. Hilburn and also assigned to the assignee of the instant invention. Both the Fiorletta et al and Hilburn amplifiers operate in the linear mode by means of a closed loop negative feedback circuit wherein a current sampling resistor is connected in series with the deflection coil of the cathode ray tube to provide a voltage which is proportional to the yoke current and thus when compared with an input drive voltage applied to the amplifier acts to force the yoke current to accurately follow the input signal voltage. The circuit thus operates to convert the input drive voltage to a proportional current flowing through the deflection coil. In other words, for a sawtooth voltage waveform applied to the amplifier, a proportional sawtooth shaped current is caused to flow through the deflection coil. Non-linear operation, on the other hand, is slightly different in each system. In the case of the Fiorletta et al system, for instance, a capacitor is connected in parallel with the deflection coil and sampling resistor for a resonant non-linear horizontal retrace and then disconnected for linear operation. In the Hilburn amplifier, the capacitor can be continuously connected in parallel with the coil and sampling resistor during both linear and non-linear operation but provision is made for effectively disconnecting the coil-capacitor circuit from the amplifier output for the resonant non-linear retrace. Continuous connection of the capacitor in circuit with the deflection coil in the Hilburn system has the adverse effect of limiting the amplifier frequency bandwidth and thereby restricting the operating frequency range of the deflection system. This limitation is overcome with the present invention by the provision of a novel bidirectional switch which acts to connect the capacitor in circuit with the deflection coil only for the resonant non-linear retrace while simultaneously effectively disconnecting the coil-capacitor circuit from the output of the driver amplifier.

SUMMARY OF THE INVENTION

A preferred cathode ray tube horizontal deflection system embodying the principles of the present invention comprises an amplifier having a differential input stage, a voltage amplification preamplifier and a push-pull current controlling output stage which connects to the deflection coil of the system. A sampling resistor is connected in series with the coil to provide a negative feedback voltage signal proportional to the coil current for use in linear operation of the system. One terminal of a capacitor is connected to the end of the deflection coil coupled to the amplifier output and the other terminal of the capacitor is connected through a bidirectional switch to a potential source. The bidirectional switch comprises a transistor and a diode connected in parallel, each constituting a respective half of the switch and operative in respective halves of the half cycle of resonant oscillation which occurs during the horizontal resonant retrace as will be described more fully in the subsequent detailed description of the preferred embodiment. For the moment, it is sufficient simply to understand that in operation of the invention the linear mode is typically employed for forward horizontal line scanning and/or symbol writing during the vertical retrace interval of the television raster scan. When the amplifier is operating in the linear mode, the bidirectional switch is in an open circuit or non-conductive condition and therefore the capacitor is disconnected from current flowing circuit relation with the deflection coil. This provides for wideband linear operation. The non-linear mode, on the other hand, is employed to achieve fast horizontal retrace for returning the electron beam from one side of the screen at the end of each scan line back to the other side in preparation for the next scan line. In the non-linear mode the bidirectional switch functions to connect the capacitor in current flowing circuit relation with the deflection coil for a prescribed interval while simultaneously another switch effectively disconnects the coil-capacitor circuit from the amplifier output whereby a resonant discharge occurs between the coil and capacitor to effect the desired rapid retrace.

It should be noted that the details of the bidirectional switch and circuit connection thereto are considered a significant feature of the invention, particularly regarding the fact that the switch is connected to a potential source as a result of which the capacitor, upon actuation of the switch, is not simply connected to ground as in the aforementioned prior art cases, but rather is coupled to the potential source, a distinction which enables simplification of the switch circuit and assures attainment of the desired operation even though only one half of the switch is actively controlled by the mode switching signal.

DESCRIPTION OF THE PREFERRED EMBODIMENT

Figure 1:
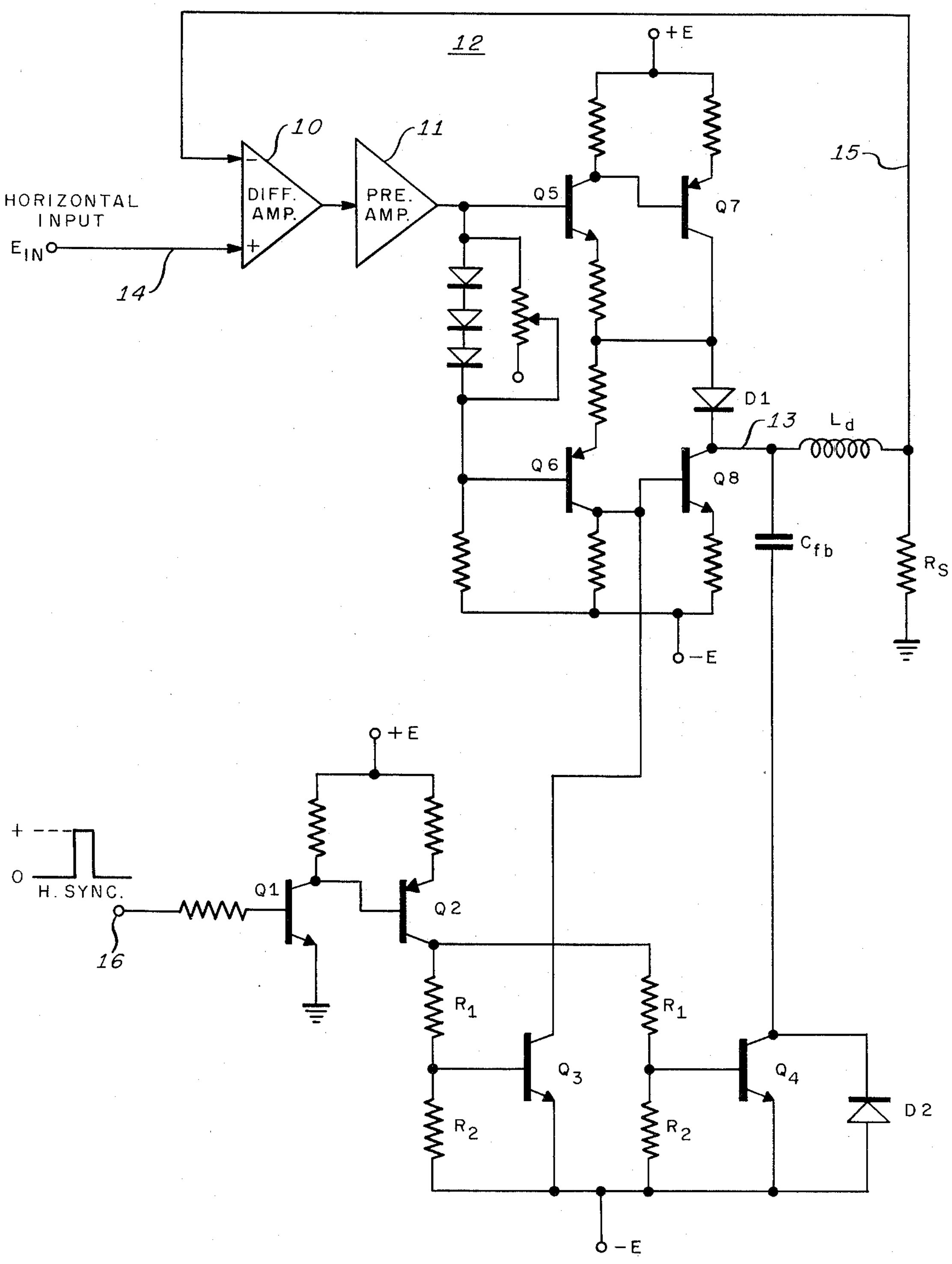
FIG. 1 is an electrical circuit schematic illustrative of a preferred embodiment of the invention.

FIG. 1 depicts an illustrative horizontal deflection amplifier, the details and functioning of which may be substantially the same as disclosed in the above-mentioned Hilburn application. The input section of the amplifier comprises a conventional differential amplifier 10 cascaded with a preamplifier 11. The power output stage 12 provides the majority of the deflection coil $L_d$ drive current amplification and comprises a symmetrical, complementary modified Darlington emitter follower. Transistors Q5 and Q7 form an equivalent NPN power section, while transistors Q6 and Q8 form an equivalent PNP power section. Output stage 12 connects via lead 13 to one end of deflection coil $L_d$, the other end of which is connected to a current sampling resistor $R_s$. The junction of the deflection coil and sampling resistor connects back to one input terminal of differential amplifier 10 for comparison in linear mode operation with the control input signal $E_{in}$ applied on lead 14 to the other input terminal of the differential amplifier. Lead 13, connecting power output stage 12 to the deflection coil $L_d$, also connects to the upper side of flyback capacitor $C_{fb}$ which, as will be described later, forms a resonant circuit with the deflection coil $L_d$ to supply the large flyback voltage spike required for resonant retrace. The other side of the flyback capacitor remote from the deflection coil connects to the junction of the cathode of diode D2 and collector of transistor Q4 which are connected in parallel, the emitter of the transistor and anode of the diode being tied to the -E potential source so that diode D2 is normally reverse biased in linear mode operation as will be explained momentarily. The parallel connection of diode D2 and transistor Q4 forms a bi-directional switch, one half of which is passive and the other half of which can be actively controlled by a switching signal applied to terminal 16 as will be explained momentarily.

Transistor Q3 acts as an additional switch which is responsive to the signal applied to terminal 16. The input to the lower section of the output of power amplifier stage 12, that is the base of transistor Q8, is connected to the collector of transistor Q3 which has its emitter connected to the -E potential source. Diode D1 connected between the collector of transistor Q7 and one end of the deflection coil serves to transmit current to the coil during conductive operation of transistors Q5 and Q7 and to protect these transistors from the large flyback voltage spike which is produced during the resonant retrace.

Figure 2A:
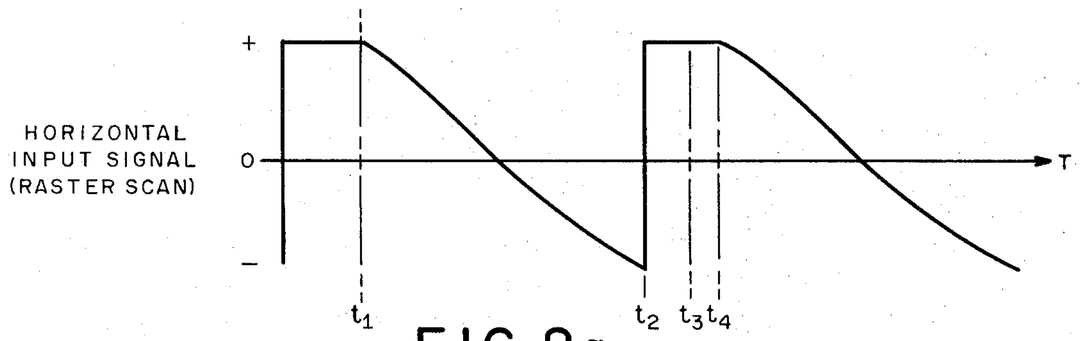
FIGS. 2*a*-2*e* depict waveforms useful for explaining the operation of the circuit embodiment of the invention shown in FIG. 1.
Figure 2B:
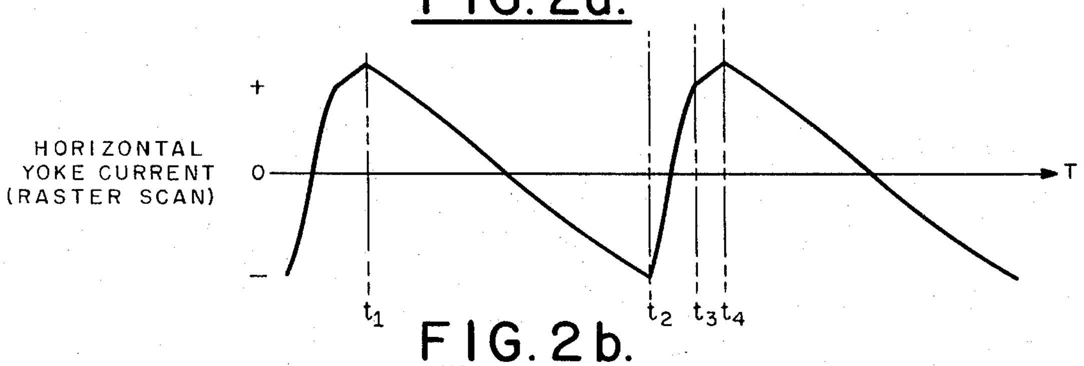
Figure 2C:
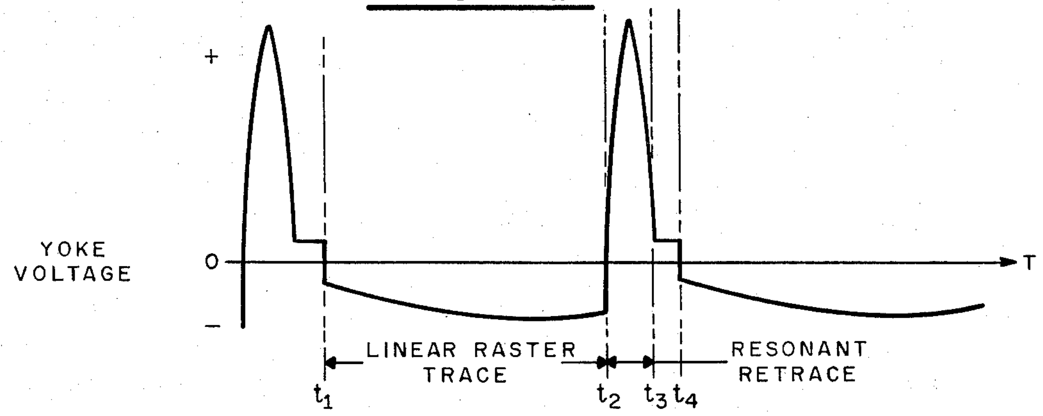
Figure 2D:
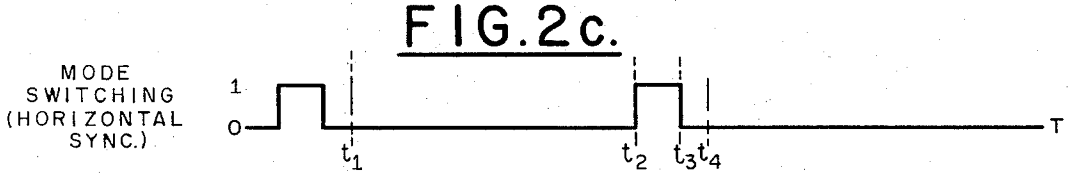

Linear amplifier operation is obtained during a horizontal sweep or vertical retrace of a raster scan simply by holding transistors Q3 and Q4 in a non-conductive state. This is accomplished by maintaining the signal at terminal 16 close to zero in the absence of a synchronizing pulse applied thereto whereby transistors Q1 and Q2 are held in a non-conductive state and thus act to render transistors Q3 and Q4 also non-conductive. Under such conditions, the horizontal input signal $E_{in}$ (FIG. 2*a*) applied to lead 14 of the differential amplifier is compared with the feedback signal supplied via lead 15. Any difference between the input and feedback signals is amplified in the differential amplifier, further amplified in preamplifier 11 and applied to power output stage 12 which supplies deflection current to the coil in one direction or the other in accordance with the conductivity of transistors Q7 and Q8. Inasmuch as the feedback voltage is proportional to the current through the deflection coil the deflection current is made precisely proportional to the horizontal input signal $E_{in}$.

Detailed operation of the circuit is as follows. Referring to FIGS. 2*a* to 2*e*, commencing at instant $t_1$ and during the interval to time $t_2$ while the horizontal sweep signal $E_{in}$ (FIG. 2*a*) is decreasing substantially uniformly from a positive peak to a negative peak, the deflection coil current (FIG. 2*b*) is caused to change correspondingly through push-pull operation of power output stage 12. The deflection coil voltage (FIG. 2*c*) is at an essentially constant small negative level during this interval as described in the aforementioned Hilburn application. The slight variation from constancy or linearity of the deflection coil voltage indicated in the drawings is a consequence of a small deflection coil current slope variation which is deliberately introduced as so-called S-shaping to compensate for the geometry of the cathode ray tube with which the deflection system is used. The S-shaping assures constant velocity of the electron beam across the screen irrespective of the screen radius of curvature relative to the radius of beam deflection. The signal inversions through the stages of the amplifier are arranged so that transistors Q5 and Q7 control the positive current through the deflection coil for the positive half of the input sawtooth voltage while transistors Q6 and Q8 control the negative current through the deflection coil for the negative half of the input sawtooth voltage during the interval $t_1$ to $t_2$ to produce the illustrated negatively sloped deflection coil current.

Termination of the horizontal sweep precisely at instant $t_2$ and commencement of the resonant non-linear retrace is accomplished by application of a positive going synchronizing pulse (FIG. 2*d*) to input terminal 16 for the purpose of turning NPN transistor Q1 on, which in turn actuates PNP transistor Q2 and appropriately level shifts the synchronizing pulse to produce a drive signal from positive potential source +E through transistor Q2 and resistors R1, R2 for application to the base terminal of transistors Q3 and Q4. Upon receiving this level-shifted synchronizing pulse, transistors Q3 and Q4 are driven into saturation. The saturated state of transistor Q3 diverts the amplifier output from the base of transistor Q8 forcing that transistor to a non-conductive state. Note though that input $E_{in}$ has at this time gone positive which normally would cause transistors Q5 and Q7 to become conductive. Upon transistor Q8 being driven into a non-conductive state, however, and before transistors Q5 and Q7 have a chance to conduct very much, if at all, the deflection coil-capacitor circuit is momentarily effectively disconnected from the amplifier output, as a consequence of the non-conductive state of transistor Q8 and a reverse bias being established across diode D1. At the same time, as previously stated, transistor Q4 is also driven into saturation. This places the flyback capacitor $C_{fb}$ in current flowing connection with the deflection coil by way of a circuit comprising the series combination of the −E potential source, transistor Q4, flyback capacitor $C_{fb}$, deflection coil $L_d$ and sampling resistor $R_s$. Formation of this circuit causes a resonant discharge of the deflection coil current into the flyback capacitor resulting in the deflection coil voltage going to a very high positive maximum at the instant the current flow through the circuit reaches zero. This high positive voltage on the coil holds diode D1 in a reverse biased condition to assure that the deflection coil-capacitor circuit remains effectively disconnected from the amplifier output. During the first part of the flyback interval the potential at the collector of transistor Q4 is slightly less negative than -E as a consequence of transistor Q4 being in saturation and therefore diode D2 remains reverse biased as it was prior to transistor Q4 being switched on. Once the condition of zero current is reached, however, with the capacitor being fully charged, the current flow reverses and the deflection coil voltage begins to decrease rapidly until time $t_3$. This decrease of positive voltage on the deflection coil side of the capacitor is tantamount to an increase in the negative voltage on the other side of the capacitor which has the effect of establishing a strong forward bias across the collector to base junction of transistor Q4 causing it to operate in a reverse or low current gain mode and at the same time forward biasing diode D2 so that most of the current flow occurring in the resonant condition from the instant of peak deflection coil voltage to time $t_3$ occurs through the diode.

Figure 2E:
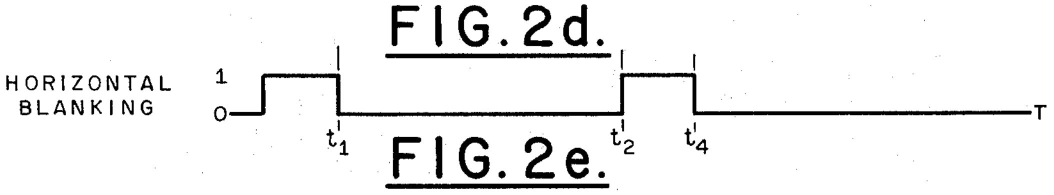

It will be noted that because of the lag of the deflection coil current relative to the input voltage, the coil current has not quite reached a positive peak at time $t_3$ when the synchronizing pulse is removed from terminal 16 to return transistors Q3 and Q4 to a non-conductive state. To assure proper operation therefore an additional small time interval $t_3$ to $t_4$ must be permitted to elapse before the next horizontal sweep commences. During the interval $t_3$ to $t_4$, the amplifier is operative once again in the linear negative feedback mode and as a result of the small residual positive voltage on the deflection coil, the error signal produced in the amplifier is such as to cause transistor Q7 to conduct so that the coil current increases linearly until it returns to its positive peak at instant $t_4$, at which time the current through the deflection coil is at the proper level to produce a voltage across the sampling resistor which is equal to the maximum input drive voltage. Also, at this time, the voltage across the deflection coil has returned to a small negative level in readiness for the next sweep at which point the operation is repeated. As indicated in FIG. 2e, the electron beam is blanked from the cathode ray tube screen commencing at the instant the synchronizing pulse is applied until the coil current has returned to its positive peak.

Linear operation of the horizontal deflection system during the entire vertical retrace interval for the purpose of symbol writing may be obtained simply by inhibiting the presentation of synchronizing pulses at terminal 16 whereby the flyback capacitor remains continuously disconnected from current flowing circuit relation with the deflection coil. During such operation, the beam is blanked from the cathode ray tube screen while being positioned for writing and then unblanked only for the writing interval.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A cathode ray tube dual mode electron beam deflection control system which may be switched to operate in either a linear or a resonant non-linear mode, comprising a deflection coil, an amplifier coupled to the deflection coil and responsive to an input signal representative of desired motion of the beam for supplying current to the deflection coil in linear mode operation, a capacitor switchably coupled in current flowing circuit connection with the deflection coil, bidirectional switching means responsive to an applied mode switching signal for coupling the capacitor in current flowing circuit connection with the deflection coil in non-linear mode operation and decoupling the capacitor from current flowing circuit connection with the deflection coil and the amplifier in linear mode operation, additional switching means responsive to the mode switching signal for effectively disconnecting the amplifier from the deflection coil in non-linear mode operation, and a source of electrical potential, said bidirectional switching means including electrically controllable semiconductor switching means and unidirectional current conductive means connected in parallel and coupled at one end to the capacitor and at the other end to a source of electrical potential with said unidirectional current conductive means poled relative to the electrical potential source so as to be reverse biased in both the linear mode and during an initial part of the non-linear mode for which the semiconductor switching means is in a conductive condition in response to the mode switching signal and thereafter forward biased during the remaining part of the non-linear mode to maintain the capacitor in current flowing circuit connection with the deflection coil irrespective of the conductive state of the semiconductor switching means.

2. The apparatus of claim 1 wherein the additional switching means comprises a semiconductor switching element connected to the amplifier output stage for setting the output stage in a non-conductive open circuit condition in response to the mode switching signal.

3. The apparatus of claim 2 including an impedance element connected in series with the deflection coil for providing a voltage representative of the current flowing therethrough to be fed back to the input of the amplifier for comparison with the input signal to maintain the current supplied by the amplifier proportional to the input signal in the linear mode.

4. The apparatus of claim 1 wherein the semiconductor switching means comprises a transistor having its collector coupled to the capacitor and its emitter coupled to the potential source so as to be responsive to the mode switching signal to operate in a normal forward biased condition during the initial part of the non-linear mode and in a low current gain mode during the remaining part of the non-linear mode as a consequence of high forward bias existing across the transistor base to collector junction at that time whereby current flow through the capacitor and deflection coil then occurs predominantly through the uni-directional current conductive means connected in parallel with the transistor.

5. The apparatus of claim 4 wherein the amplifier includes a push-pull output stage having first and second sections operating such that the first section controls positive current to the deflection coil for one polarity of the input signal and the second section controls negative current to the deflection coil for the opposite polarity of the input signal, and further includes additional unidirectional current conductive means connected intermediate the deflection coil and the output of one section for blanking therefrom the high voltage spike produced at the deflection coil upon switching to the non-linear mode.

6. The apparatus of claim 5 wherein the additional switching means comprises a transistor switching element coupled to the output of the other push-pull section for diverting drive signal therefrom upon being driven into a saturated conductive condition by the mode switching signal.

7. The apparatus of claim 6 including an impedance connected in series with the deflection coil for providing a voltage representative of the current flowing therethrough to be fed back to the input of the amplifier for comparison with the input signal to derive an error signal equal to the difference between the input and feedback signals for controlling the current supplied by said amplifier means in the linear mode.

* * * * *